Patented Nov. 3, 1942

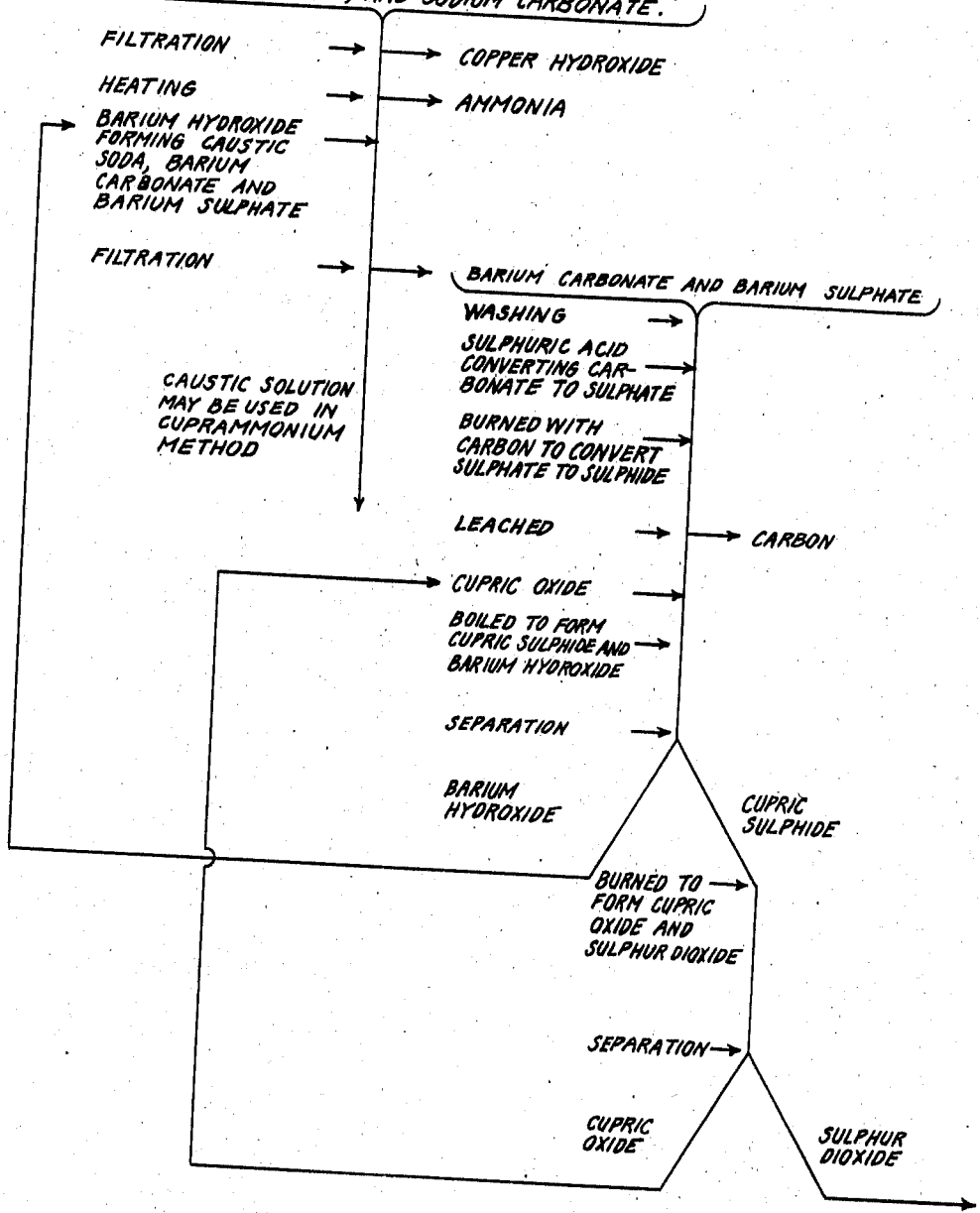

2,300,883

UNITED STATES PATENT OFFICE 2,300,883

METHOD OF RECOVERING SODIUM HYDROXIDE FROM ALKALINE WASH LIQUORS

William H. Furness, Haddonfield, N. J., assignor to American Rayon Company, Inc., Riverton, N. J., a corporation of New Jersey Application May 13, 1940, Serial No. 334,894

4 Claims. (Cl. 23—185)

This invention relates to a method of recovering sodium hydroxide from alkaline liquors, and it is particularly useful in the recovery of caustic soda from the alkaline wash liquors of the cuprammonium process of manufacturing rayon, films, staple and the like, of my copending application Serial No. 332,694, filed May 1, 1940. In that process the freshly spun material is at one stage subjected to a water wash to remove caustic soda, copper and ammonia therefrom. The wash liquor additionally contains sodium sulphate and sodium carbonate derived from the system.

The accompanying drawing is a flow-sheet, illustrating diagrammatically a system which includes the preferred cycle of my invention.

The copper is insoluble and can be readily removed from the wash liquor by filtration, settling or the like. The ammonia is removed by heating. Caustic soda and sodium sulphates and carbonates remain behind in the solution. In addition to driving off ammonia, the heating increases the concentration of the chemicals in the wash liquor, and is continued until a concentration effective for recovery is obtained.

The amount of sulphates and carbonates is now determined and to the concentrated liquor, while still hot, is added an equivalent amount of barium hydroxide in solution. It is undesirable to have any excess of barium hydroxide in order to avoid carryover. In fact, it is best to err on the safe side and use slightly less than the theoretical equivalent amount of barium hydroxide.

The barium hydroxide leaves the caustic soda in the liquor unaffected, but reacts with the sulphates and carbonates to form additional caustic soda and also barium carbonate and barium sulphate. The reactions proceed along the general lines:

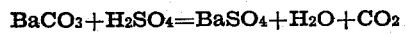

The barium carbonate and barium sulphate are insoluble and precipitate.

The barium hydroxide solution is added to the hot liquor in hot condition in order to obtain a dense precipitate which will fall out in a few moments. Furthermore, since barium hydroxide has low solubility in cold water, the barium hydroxide solution should be hot in order to make it possible to employ a concentrated solution thereof.

The precipitated barium sulphates and carbonates can be readily separated from the liquor containing the sodium hydroxide, as for example by decanting, filtering or the like.

The separated barium sulphate and carbonate can be readily washed, after which a small amount of sulphuric acid is added to convert the carbonate into barium sulphate, the reaction being substantially:

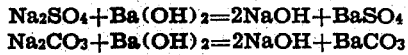

The barium sulphate is now burned or roasted with carbon to form barium sulphide, about 1560° C. being required. The barium sulphide is now leached from the carbon with hot water and to the barium sulphide solution thus obtained is added cupric oxide, in equivalent amount. The solution is now boiled, producing cupric sulphide and barium hydroxide. These are separated and the barium hydroxide is utilized to treat some additional alkaline wash liquor.

The cupric sulphide is now burned or roasted in the same manner as pyrites, which produces cupric oxide and sulphur dioxide.

The cupric oxide thus produced is utilized to convert some additional barium sulphide into barium hydroxide. The sulphur dioxide obtained is usable in the manufacture of wood pulp.

The caustic soda solution obtained by the process may be advantageously used in various ways, depending upon its concentration. For example, it may be used to fortify the setting bath, or it may be used in the preparation of cellulosic spinning solution (goo).

I claim:

1. A cyclic process of recovering and reusing treating agents and materials of a wash liquor used in the cuprammonium method of manufacturing rayon, films, staple and the like, which wash liquor contains water, caustic soda, sodium sulphate and sodium carbonate, including the steps which comprise: (a) adding barium hydroxide to the liquor to convert sodium sulphate and sodium carbonate to barium sulphate, barium carbonate and caustic soda; (b) separating the barium sulphate and carbonate from the liquor, which liquor then comprises a caustic soda solution adapted for reuse in said cuprammonium method; (c) adding sulphuric acid to the barium sulphate and carbonate to convert the carbonate to sulphate; (d) burning the barium sulphate with carbon to convert the sulphate to sulphide; (e) separating the carbon from the barium sulphide and dissolving the sulphide in water; (f) adding cupric oxide and boiling the solution to form cupric sulphide and barium hydroxide; and (g) separating the cupric sulphide and barium hydroxide, and reusing the barium hydroxide in step (a).

2. A process in accordance with claim 1 and further including the following steps: (h) burning the cupric sulphide to form cupric oxide and sulphur dioxide; and (i) separating the cupric oxide and sulphur dioxide, and reusing the cupric oxide in step (f).

3. A process in accordance with claim 1 in which the quantity of barium hydroxide added in step (a) is in the neighborhood of but not above the theoretical amount required to convert the sodium sulphate and sodium carbonate.

4. A process in accordance with claim 1 in which step (a) is effected by dissolving the barium hydroxide in water and mixing the solution with the liquor while both are heated.

WILLIAM H. FURNESS.